US005338280A

United States Patent [19]

[11] Patent Number: 5,338,280

Morando

[45] Date of Patent: Aug. 16, 1994

[54] ANNEALING AND TUNNEL FURNACE ROLLS

[76] Inventor: Jorge A. Morando, 34210 James J. Pompo Dr., Fraser, Mich. 48026

[21] Appl. No.: 36,328

[22] Filed: Mar. 24, 1993

[51] Int. Cl.[5] .............................................. B23P 15/00

[52] U.S. Cl. ........................................ 492/36; 492/30; 492/39

[58] Field of Search .................................... 492/30–36, 492/39

[56] References Cited

U.S. PATENT DOCUMENTS

| | | | |
|---|---|---|---|
| 2,653,814 | 9/1953 | Lorig | 492/36 |
| 3,051,460 | 8/1962 | Furczyk . | |
| 3,845,534 | 11/1974 | Kustus et al. | 492/36 |
| 4,104,772 | 8/1978 | Sarters | 492/35 |
| 4,149,303 | 4/1979 | Appenzeller | 492/35 |
| 4,832,186 | 5/1989 | Conrad | 492/35 |

FOREIGN PATENT DOCUMENTS

| | | | |
|---|---|---|---|
| 018735 | 5/1983 | U.S.S.R. | 492/35 |

*Primary Examiner*—Irene Cuda
*Attorney, Agent, or Firm*—Charles W. Chandler

[57] ABSTRACT

An annealing roll for transferring steel strips from an annealing furnace has several spaced rings along the body of the roll. The rings have a width and diameter chosen such that the load on each ring is optimized depending upon the material of the strip and the ring material. The selected ring material is relatively insoluble with the strip material.

2 Claims, 3 Drawing Sheets

PERIODIC TABLE

| IA | IIA | IIIB | IVB | VB | VIB | VIIB | VIII | | | IB | IIB | IIIA | IVA | VA | VIA | VIIA | Inert Gases |
|---|---|---|---|---|---|---|---|---|---|---|---|---|---|---|---|---|---|
| H | | | | | | | | | | | | | | | | | He |
| Li | Be | | | | | | | | | | | B | C | N | O | F | Ne |
| Na | Mg | | | | | | | | | | | Al | Si | P | S | Cl | Ar |
| K | Ca | Sc | Ti | V | Cr | Mn | Fe | Co | Ni | Cu | Zn | Ga | Ge | As | Se | Br | Kr |
| Rb | Sr | Y | Zr | Nb | Mo | Tc | Ru | Rh | Pd | Ag | Cd | In | Sn | Sb | Te | I | Xe |
| Cs | Ba | La | Hf | Ta | W | Re | Os | Ir | Pt | Au | Hg | Tl | Pb | Bi | Po | At | Rn |
| Fr | Ra | Ac | | | | | | | | | | | | | | | |

ANNEALING AND TUNNEL FURNACE ROLLS

BACKGROUND OF THE INVENTION

Annealing furnace rolls transfer hot steel strips from the furnace. Several problems occur that reduce the life of such rolls. For example, the rolls tend to "pick up" material from the strip because of an adhesive characteristic. This property causes the rolls to wear, consequently requiring frequent roll replacement. In addition, the rolls are usually made with a welded construction. Heat transferred from the strip to the roll tends to weaken the welds. The weakened rolls are expensive to replace.

SUMMARY OF THE INVENTION

The broad purpose of the present invention is to provide a roll for an annealing furnace having a substantially greater fatigue life. One aspect of the invention is to provide a series of wear rings that are welded along the length of the roll so the steel strip contacts a reduced surface area rather than the entire cylindrical surface of the roll. The rings reduce the amount of heat being transferred to the welds on the roll, thus lengthening the life of the roll. The wear rings can be easily replaced which reduces the cost of replacing the entire roll.

The roll material is selected to provide maximum strength at the usual operating temperatures with no restriction on its "sticking" or "pick-up" characteristics.

The wear rings are independently slipped on and welded to the roll body. Since they are not machined from the roll body, but are welded in place, the wear ring material is selected for its durability, that is, to reduce "pick-up".

The "pick-up" characteristics of the wear ring do not form a linear relationship with the load on the ring. I have found that the tendency of the strip material to adhere to the wear ring is initially very high on a relatively small area, as would be expected. Increasing the area reduces the "pick-up" characteristics to a point where there is a minimal "pick-up". The "pick-up" characteristic then increases as the contact area increases (see FIG. 2). Consequently, by properly selecting the ring diameter and width, the "pick-up" characteristic can be minimized.

I have further discovered that the "pick-up" characteristic of the ring depends on the strip material and the ring material. To reduce the amount of metal being transferred from the steel strip to the wear ring, the wear ring material is chosen to reduce the relative solid solubility of the two metals.

The theory behind this discovery is that in a true metal represented by elements in the left-hand column of the periodic table of the elements, FIG. 4, the bonds that hold the atoms and the crystal lattice are mobile. The electrons from the outer shell are free to move about the crystal. The mobility of "metallic bonding" gives metals their strength and ductility. As one moves toward the right-hand side of the periodic table, the bonds become more "covalent". Atoms tend to share the electron pairs which are no longer free to move about in the crystal lattice. Covalent crystals are brittle and friable. When two metals are welded together and one tends to covalent bonding (that is, when it is the "B" sub-group), the weld seems to have covalent bonding. It is brittle and friable. Such pairs of metals produce a weak weld.

It is this characteristic that I employ in my invention, that is, to use a ring material that would form a "weak weld" with the materials of the steel strip, and thereby minimize "pick-up". I believe that the criteria for selecting such metals is (to choose two metals that can slide with each other with relatively little scoring) accomplished if most of the following conditions are met:

(1) The two metals are insoluble in each other since insoluble metals have smaller values of surface energy than soluble metals.

(2) At least one of the metals in the steel alloy is from the "B" sub-group of the periodic table; or two of the metals in the alloy are on the left side of the table (see FIG. 4)

(3) The wear ring material must have negligible creep rate, in other words, with very high creep stress at the operating temperature (700 PSI or higher) at 1% and 10,000 hours. When creep occurs it increases the real area of contact, decreasing the elastic energy and producing undesirable adhesion.

(4) The wear ring material must have a very high elastic modulus to assure a drastic reduction in the real area of contact when the load is removed and the residual stresses enter into play, assuring elastic "spring-back".

(5) The material must have very low surface energy since this will make it easier for a weld junction to be broken.

(6) The diameter of the rings is as small as possible, commensurate with the strength and geometric configuration needs of the roll for the particular case under consideration. A small ring diameter does not allow for the real area of contact to grow and is preferred over a geometry which makes junction growth easier. Also, a smaller diameter reduces the time of contact in which creep may occur.

The invention also provides an improved annealing furnace roll formed with a tubular body and including a ceramic insulator for reducing the heat transfer from the strip to the roll shafts.

Still further objects and advantages of the invention will become readily apparent to those skilled in the art to which the invention pertains, upon reference to the following description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
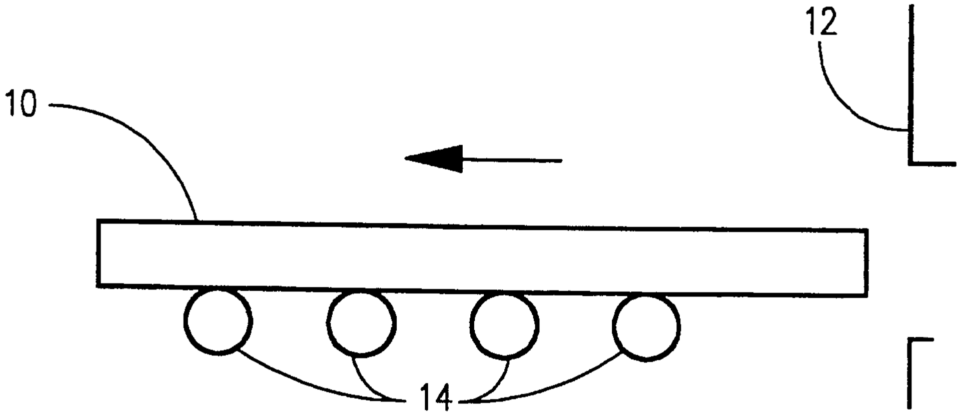
FIG. 1 is a view of a steel strip exiting an annealing furnace on rolls, illustrating the preferred embodiment of the invention.

Referring to the drawings, FIG. 1 schematically illustrates a steel strip (10) being removed from an annealing furnace (12) on a series of driven conveyer rolls (14).

The general process is well known to those skilled in the art.

Figures 3, 4:
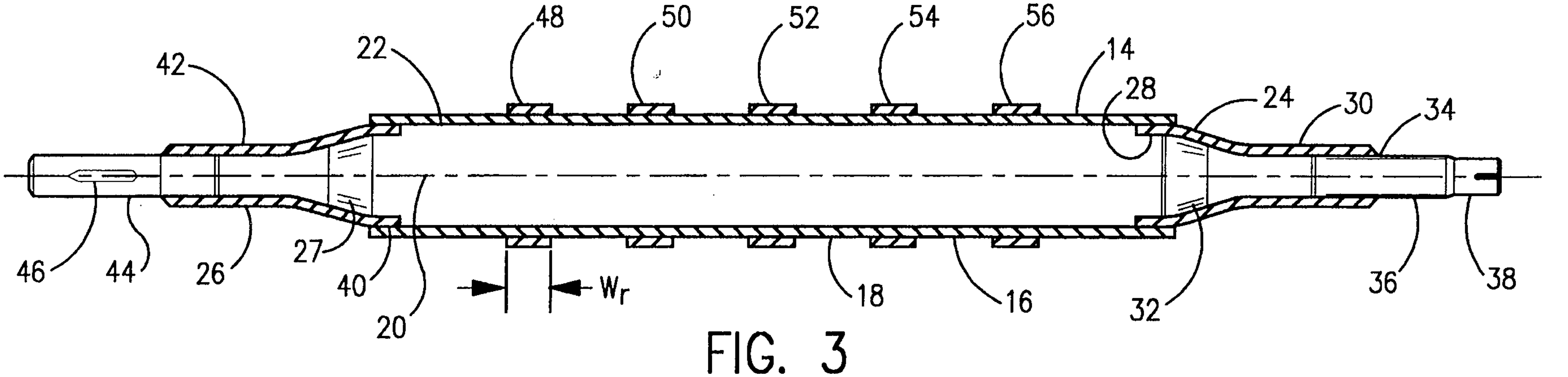
FIG. 3 is a longitudinal cross-section through a roll, illustrating the preferred embodiment of the invention.
FIG. 4 is a view of the periodic table of elements.

FIG. 3 illustrates the longitudinal cross-section of the preferred inventive roll (14). Roll 14 has a tubular body (16), preferably NICHRON 72, which is selected for its strength at the highest operating temperature. The reason is that a strip has substantial weight in addition to substantial width. The overall length of the roll varies with the width of the strip being carried to about 120 to 140 inches. The body has a cylindrical outside surface (18) with a diameter and thickness depending on the weight of the strip (about 10-½ inches as an example). The body (16) is formed about a longitudinal axis (20), and has a ⅜-inch vent hole (22) adjacent to one end. The body has an internal diameter of 8-¼ inches in the particular example being presented.

A pair of bell-shaped members (24) and (26) are welded to opposite ends of the body (16). Each bell-shaped member has an inner end (28) welded to the end of the body for a distance of about 3 inches in this example. Members 24 and 26 each have a length of about 16-¼ inches, including a narrowed cylindrical section (30) about 10-¾ inches long. A ceramic plug (32) is received in the tapered midsection of member 24. Member 24 is preferably formed of NICHRON 72 available from Alphatech, Inc., 34210 James J. Pompo Drive, Fraser, Mich. 48026. The ceramic plug of Alphatech ZRS10 is available from the same source.

The outer end of section 30 receives the end of a shaft (34). The shaft is welded to tubular section 30. About 3-½ inches of the shaft is received inside section 30. The shaft has a midsection (36) about 6-½ inches long for seating on a bearing, and a keyed journalled end (38).

The bell-shaped section (26) has a 3-inch-long cylindrical end received at the opposite end of the tubular body (16). Section 26 is also welded to the tubular body. A second ceramic plug (27) is received in the funnel-shaped midsection of body 26. Body 26 has a cylindrical outer end (42) having a 3.5-inch internal diameter adapted to be seated in a bearing. The outer end (42) receives the inner end of a shaft (44) which is aligned with the longitudinal axis (20) of the roll as well as the axis of shaft 36. Shaft 44 has about a 7-inch keyway (46). For this particular example, five wear rings (48) are mounted on the tubular body. Each wear ring has a 12-inch outside diameter and a width "A" of 3-¼ inches. The rings are spaced a distance of 10 inches between adjacent rings with the center of ring 52 being located 35 inches from the end of tubular body 16. The wear rings, whose material has been selected for its low "pick-up" characteristic when in contact with carbon steels, are slid onto the tubular body and welded in position. The ring material is preferably a NICO 6-1 alloy steel or in the alternative NICO 10 alloy steel, both available from Alphatech, Inc. The shaft ends (44) and (36) are preferably a 304 alloy steel or in the alternative, a 17-4 alloy steel.

The ring material is selected by a comparison with the material of a steel strip so that the two materials now meet all or most of the six requirements outlined earlier. In addition, the ring material is selected for its durability and its appropriate oxidation characteristics.

The rings can be easily removed and replaced, at a fraction of the cost of a new conventional roll. Further, the rings minimize the heat radiated and transferred from the steel strip to the remainder of the roll, thus enhancing the life of the welds connecting the bell-shaped shaft members to the tubular body.

The chemical composition of the wear rings is closely controlled. The most important elements to control are as follows:

$C \rightarrow$ '$0.80 \pm 0.40\%$
$S_I \rightarrow 1.20 \pm 0.05\%$
$N_I \rightarrow 36.00 \pm 2.00\%$
$C_R \rightarrow 26.00 \pm 2.00\%$
$C_O \rightarrow 6.00 \pm 2.00\%$
$W \rightarrow 5.00 \pm 1.00\%$ Experimental testing that I have conducted has shown that these elements are related by the following empirical equation:

$$\frac{Si + [C(Ni + Co/40)]^3}{.20W + .10(Cr + Ni + Co - 68)} = 1.0 \pm .12$$

when the material of the strip in contact with the wear rings is carbon steel.

Figure 2:
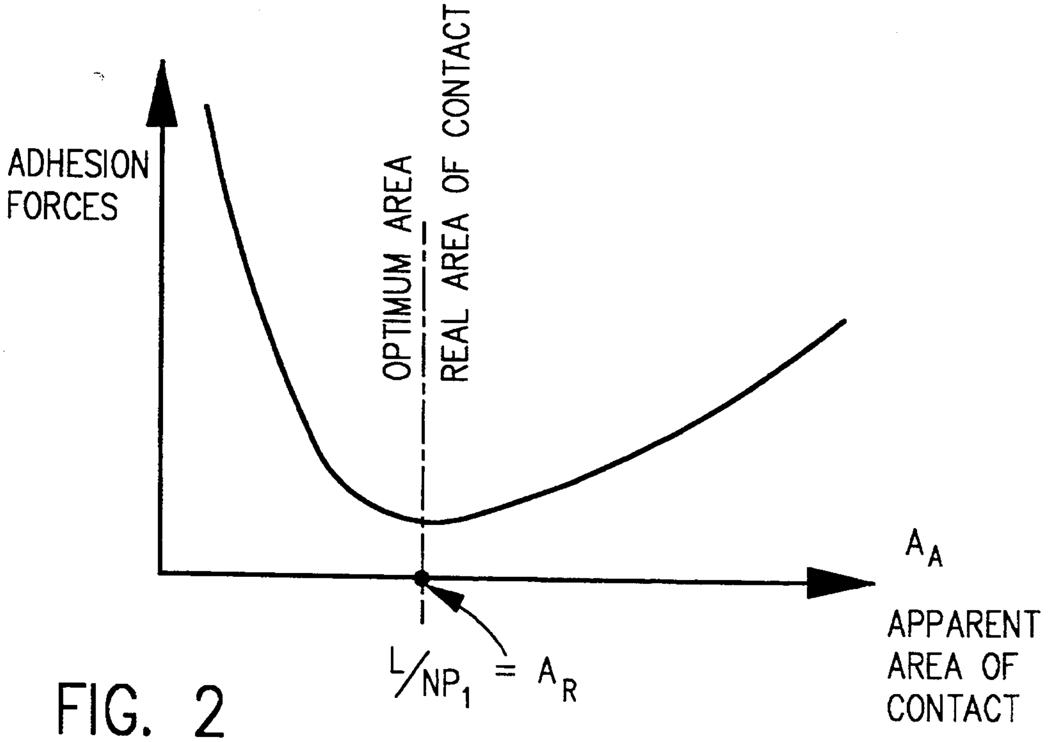
FIG. 2 is a chart indicating the relationship between the adhesion forces on a roll and the area of contact.

The width of the ring is carefully chosen, recognizing the relationship and difference between the apparent area of contact and the real area of contact between the strip and the wear ring (see FIG. 2) and its impact on the adhesion or "pick-up" characteristics between the roll and the strip. For example, referring to FIG. 2, the optimal theoretical ring area is determined by the formula:

$$A_r = \frac{L}{NP}$$

Where:
L=Total Load
N=Number of Rings
P=Penetration Hardness

The total friction force:

$$F = T_{AD} x A_r$$

shows the importance of minimizing the contact area $A_R$.

Where: $T_{AU}$=Average Shear
Coefficient of Friction:

$$f = \frac{F}{L} = \frac{T_{AU} \times A_r}{P \times A_r} = \frac{T_{AU}}{P}$$

is independent of the area in contact and shows the importance of the selection of the materials in contact, but the total friction force is not.

Figure 5:
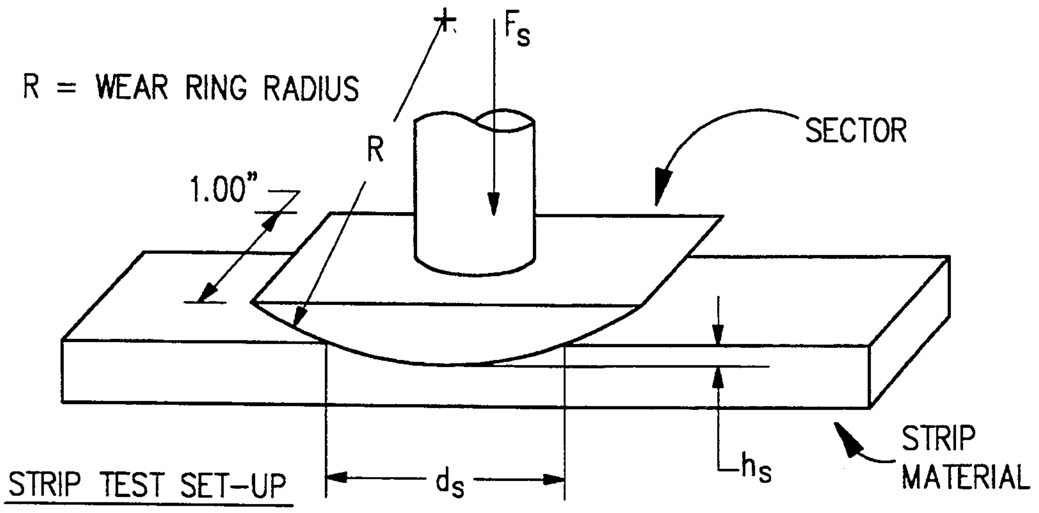
FIG. 5 is a view of the strip test set-up.

In order to arrive at the optimum width of the wear rings, an experimental test must be performed utilizing a sample of the strip material to be conveyed and a metal sector with a radius identical to the radius selected for the wear rings (see FIG. 5). A compression test can be conducted with the strip material preheated to the furnace operating temperature and the values of the penetration ($h_S$) (see FIGS. 5 and 6) versus the compression force ($F_S$) recorded. If the width of the metal sector of radius "R" has a unit thickness, the values of the contact area can be easily calculated because of the geometrical relationship. The area of contact $A_s$ on the curve section of the sector due to the extremely small penetration ($h_S$) will be sufficiently close to the area calculated using the cord ($d_S$). In other words, $$A_S \cong d_S \text{ in in}^2$$

Figure 6:
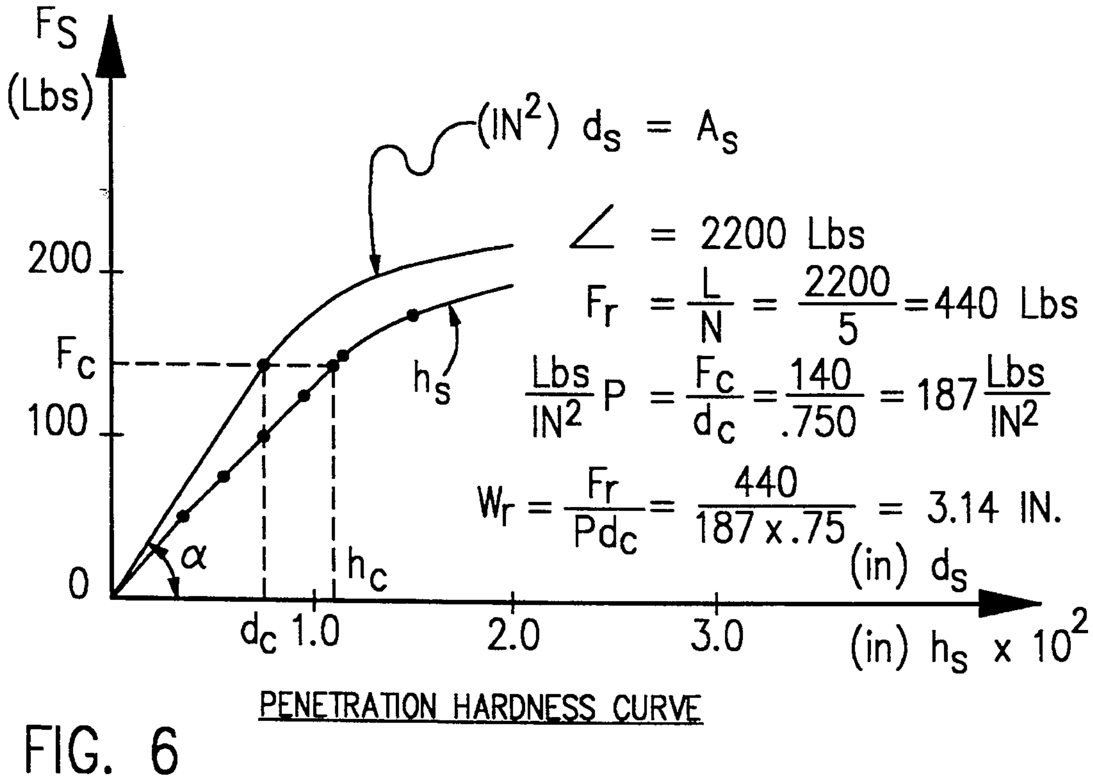
FIG. 6 is a penetration hardness curve.

From FIG. 6, it can be established that the point at which the deformations ($h_S$) (or $d_S$) are no longer proportional to the force ($F_S$) applied occurs approximately at a value of $F_B = F_C$. A line forming an angle $\alpha$ with respect to the $d_S$ axis will intercept the $F_S$-versus-$d_S$ curve plotted at that point where:

$$\frac{F_c}{d_c} = P$$

or $$\text{TANGENT}\alpha = P$$

Where:

$F_C$=Critical sector load $d_C$=Critical length of contact

P=Penetration hardness

Theoretically, at a given strip temperature this value ($d_C$) is unique for each strip material being processed and for each particular value of the wear ring radius (R). Testing has demonstrated, however, that the values of ($d_C$) are nearly identical for most carbon steel materials operating at the same temperature, thus simplifying the calculation of the optimum wear ring area in most cases. After the number of wear rings to be used on the roll has been selected, based on the width of the strip to be conveyed (usually three to six rings will be sufficient), the total load force applied by the strip on the individual rings can be established as follows:

$$F_r = \frac{L}{N}$$

where:

L=Total load

N=Number of rings

The width of the wear ring can then be calculated as follows:

$$W_r = \frac{F_r}{P \times d_c}$$

And, since $F_C$ was established for a unit width, then also $$W_r = \frac{F_r}{F_c}$$

The importance of obtaining the value of $d_C$ by experimental testing is that it includes the surface properties of the material being conveyed. The material surface properties are important since an energy change takes place during the motion. This is a result of the volume deformation of the strip in contact with the wear ring, brought about by its own weight. When the surface energy is taken into consideration $A_r$ (real area of contact) will always be greater than is indicated in:

$$A_r = \frac{L}{NP}$$

This effect is especially pronounced when the surface energy is very large or the surface roughness is very small.

Thus, may it be understood that I have described an annealing roll having replaceable wear rings. The wear rings are chosen of a material having a low welding characteristic with respect to the steel strip being carried. In addition, the wear rings' shape is designed to optimize wear characteristics according to the load being carried.

Having described my invention, I claim:

1. A roll for transferring a flat, heated strip of a first steel alloy from an annealing furnace, comprising:

an elongated tubular body having a longitudinal axis;

shaft means attached to opposite ends of the body for supporting the body for rotation about the axis;

structure integrally disposed on said body forming a discontinuous surface for contacting and supporting the flat heated strip on the tubular body as the tubular body is being rotated, said structure being formed of a second steel alloy selected so as to be relatively insoluble with respect to the first steel alloy of the heated strip; and the area of contact between the steel strip and the structure on the roll being chosen according to the formula L/P, in which L is the load of the strip on said structure and P is the penetration hardness of the strip material at the furnace operating temperature.

2. A roll for transferring a flat heated strip of a first steel alloy from an annealing furnace, comprising:

an elongated tubular body having a longitudinal axis;

shaft means attached to opposite ends of the body for supporting the body for rotation about said axis;

integral structure of a second steel alloy forming longitudinally spaced enlargements on the tubular body for contacting and supporting the flat steel strip as the tubular body is being rotated;

the enlargements having a surface area contacting the steel strip, the surface area being chosen to minimize either removal of the second steel alloy from said integral structure by the heated strip, or removal of the first steel alloy from the heated strip by the integral body structure; and the surface area of the enlargements contacting the steel strip being chosen according to the formula L/P, in which L is the load of the strip on the enlargements, and P is the penetration hardness of the strip material at the furnace operating temperature.

* * * * *